United States Patent
Winzinger et al.

(10) Patent No.: US 8,729,431 B2
(45) Date of Patent: May 20, 2014

(54) FURNACE FOR CONDITIONING PREFORMS

(75) Inventors: Frank Winzinger, Regensburg (DE); Christian Holzer, Schierling (DE); Wolfgang Schonberger, Brennberg (DE); Konrad Senn, Regensburg (DE); Andreas Wutz, Roding (DE)

(73) Assignee: Krones AG, Neutraubling (DE)

( * ) Notice: Subject to any disclaimer, the term of this patent is extended or adjusted under 35 U.S.C. 154(b) by 535 days.

(21) Appl. No.: 12/959,410

(22) Filed: Dec. 3, 2010

(65) Prior Publication Data

US 2011/0132892 A1 Jun. 9, 2011

(30) Foreign Application Priority Data

Dec. 4, 2009 (DE) .......................... 10 2009 047 537

(51) Int. Cl.
*B29C 49/64* (2006.01)
*B29C 49/68* (2006.01)

(52) U.S. Cl.
USPC ............ 219/388; 219/428; 264/458; 264/535

(58) Field of Classification Search
None
See application file for complete search history.

(56) References Cited

U.S. PATENT DOCUMENTS

| | | | | | |
|---|---|---|---|---|---|
| 4,117,050 | A | * | 9/1978 | Appel et al. ................... | 264/458 |
| 4,134,950 | A | * | 1/1979 | Appel et al. ................... | 264/458 |
| 4,233,010 | A | * | 11/1980 | Suzuki .......................... | 425/143 |
| 4,261,949 | A | * | 4/1981 | Spurr et al. ................... | 264/535 |
| 4,299,549 | A | * | 11/1981 | Suzuki et al. ................. | 425/214 |
| 4,634,375 | A | * | 1/1987 | Hailey .......................... | 219/388 |
| 4,690,633 | A | * | 9/1987 | Schad et al. .................. | 264/535 |
| 4,729,732 | A | * | 3/1988 | Schad et al. .................. | 264/535 |
| 4,758,157 | A | * | 7/1988 | Hailey .......................... | 432/121 |
| 5,308,233 | A |   | 5/1994 | Denis et al. | |
| 8,501,078 | B2 | * | 8/2013 | Meinzinger ................... | 264/521 |

FOREIGN PATENT DOCUMENTS

| | | |
|---|---|---|
| CN | 2379294 Y | 5/2000 |
| CN | 1288811 A | 3/2001 |
| DE | 4033531 A1 | 5/1992 |
| DE | 69900777 T2 | 8/2002 |
| DE | 102006015853 A1 | 10/2007 |
| DE | 102008011755 A1 | 9/2009 |
| DE | 10200904055 A1 | 3/2011 |
| EP | 0849067 A1 | 6/1998 |
| GB | 2074496 A | 11/1981 |

(Continued)

OTHER PUBLICATIONS

DE 10 2006015853 A1, Heating of Plastics, John et al, partial translation.*

(Continued)

*Primary Examiner* — Joseph M Pelham
(74) *Attorney, Agent, or Firm* — Marshall, Gerstein & Borun LLP

(57) ABSTRACT

A rotary-type furnace for conditioning preforms with a heating wheel at which several heating modules for heating one preform each are arranged, wherein the heating modules are each a heating chamber and a holding device for the preform. The furnace has a lifting device for lifting and lowering the holding device and/or the heating chamber to change between a loading or withdrawal position, in which the preform does not overlap with the heating chamber in the direction of its main axis, and a radiation position in which a section of the preform is arranged within the heating chamber, a particularly quick and reliable transfer from an infeed starwheel can be realized.

27 Claims, 11 Drawing Sheets

(56) References Cited

FOREIGN PATENT DOCUMENTS

| JP | 60040227 A | | 3/1985 |
|---|---|---|---|
| JP | 63215529 A | * | 9/1988 |
| JP | 02310021 A | | 12/1990 |
| WO | WO-0181069 A1 | | 11/2001 |
| WO | WO-2006005324 A2 | | 1/2006 |
| WO | WO-2006097056 A1 | | 9/2006 |
| WO | WO-2008154503 A2 | | 12/2008 |

OTHER PUBLICATIONS

Search Report for DE102009047537 mailed Nov. 3, 3011.
Search Report for EP10193463 mailed Oct. 18, 2011.
Search Report for Chinese Application No. 201010579791X., Mar. 2013 (approx.).

* cited by examiner

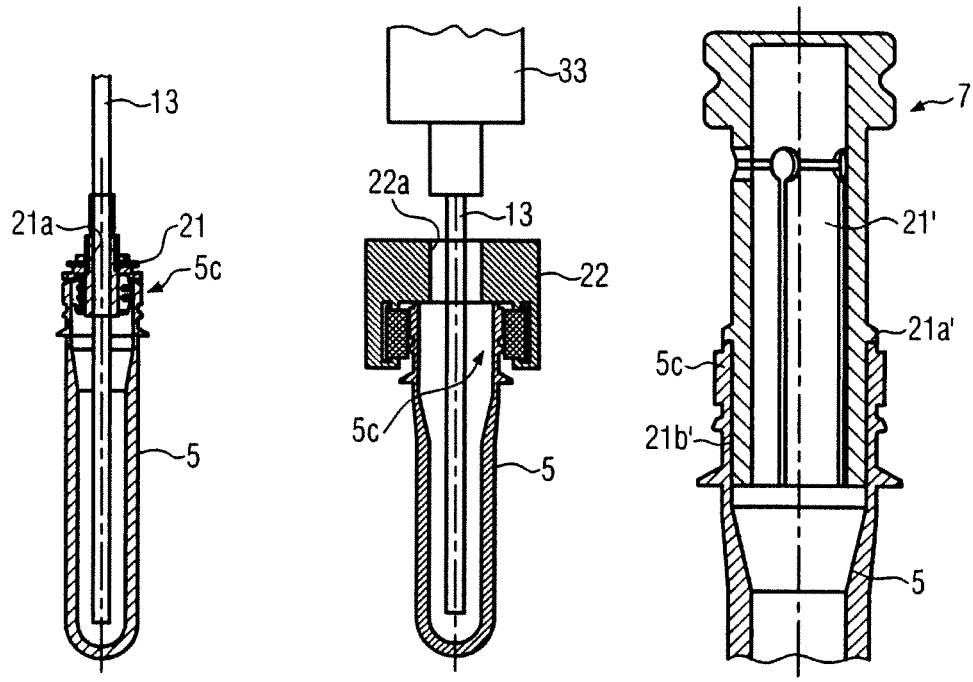
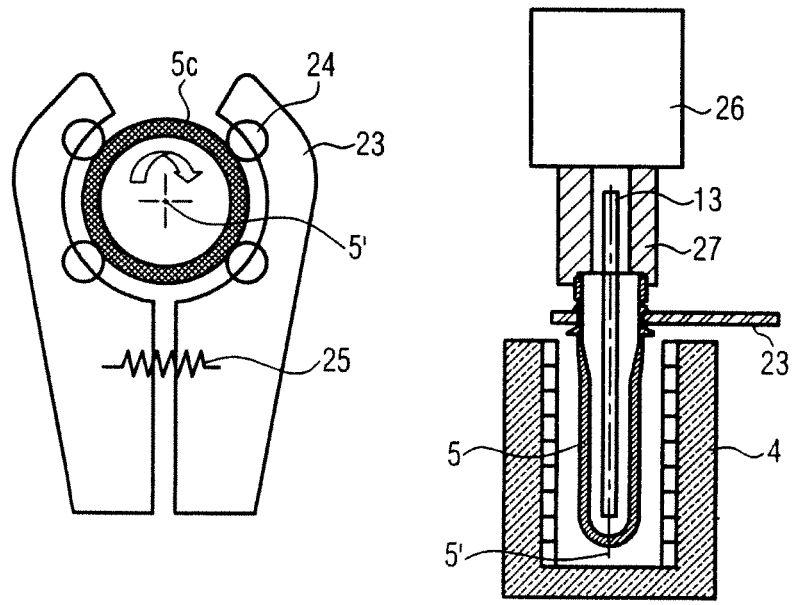

FURNACE FOR CONDITIONING PREFORMS

CROSS-REFERENCE TO RELATED APPLICATION

The present application claims the benefit of priority of German Application No. 102009047537.0, filed Dec. 4, 2009. The entire text of the priority application is incorporated herein by reference in its entirety.

FIELD OF THE DISCLOSURE

The disclosure relates to a furnace for conditioning preforms, such as used for molding containers for beverage bottling operations.

BACKGROUND

Containers to be manufactured by blow molding or stretch blow molding are shaped from so-called preforms that have to be heated to a desired process temperature before the actual blowing procedure. To be able to reshape, during blow molding, the rotationally symmetric preforms, which normally have standardized wall thicknesses, to containers having a certain shape and wall thickness, individual wall regions of the preform must be subjected to dosed heating in a furnace, preferably with infrared radiation. To this end, usually a continuous stream of preforms is passed through a furnace with correspondingly adapted radiation sections. It is, however, a problem of such furnaces to selectively introduce a maximum proportion of the radiated thermal output into the preforms.

As an alternative, patent publication DE 10 2006 015853 A1 suggests to heat preforms in individual radiation chambers that each completely surrounds the preforms, the individual chambers being arranged like a carrousel. In the process, each preform is heated both by the inner wall of the chamber embodied as ceramic infrared radiator and by a rod-shaped infrared radiator which is introduced into the preform. In the process, the preform is essentially completely arranged within the radiation chamber.

DE 10 2006 015853 A1, however, says nothing as to how the loading of the furnace with preforms or the withdrawal of the same is to be designed in an efficient way to ensure an economical operation of the carousel furnace. However, just during the transfer at an infeed starwheel or a discharge starwheel, a problem arises in that a three-dimensional change of position of the preform must be accomplished within a very short time and with maximum transfer reliability, and in that the preforms must be placed sufficiently precisely in the individual heating chambers.

Therefore, there is a need for a furnace with separate heating chambers improved in this respect.

SUMMARY OF THE DISCLOSURE

It is one aspect of the disclosure to provide a furnace for performs having a lifting device for lifting and lowering the holding device for the preforms and/or for lifting and lowering the heating chamber is provided to change between a loading or withdrawal position, in which the preform does not overlap with the heating chamber in the direction of its main axis, and a radiation position in which a section of the preform is arranged within the heating chamber. This permits an easy lateral or radial transfer of the preforms from a conventional infeed starwheel, such as a reduction starwheel, and a corresponding transfer to a conventional discharge starwheel. Thus, no lifting devices must be provided at the infeed or discharge starwheel, respectively. The advantages of the disclosure are in particular also possible by the lifting devices of individual heating modules being independently controllable.

In one preferred embodiment, the heating modules furthermore comprise a heating rod for radiating the preform with infrared radiation, and the lifting device is furthermore adapted to lift and lower the holding device and/or the heating rod to change between a loading or withdrawal position, in which the holding device and the preform moreover do not overlap with the heating rod in the direction of its main axis, and a radiation position, in which moreover a section of the heating rod is arranged within the preform. This ensures that even with an additionally provided heating rod, a transfer from a conventional infeed starwheel or to a conventional discharge starwheel, respectively, is easily possible, i.e. in a lateral or radial direction, respectively.

As infrared radiators, for example heating spirals, heating spirals embedded in a ceramic layer, light-emitting diodes, laser and/or halogen spot lights are suited. However, other sources of radiation can also be used. Their emissions are not necessarily restricted to infrared light.

The heating rod can also be designed as reflecting rod that only passively heats the preform.

The heating rod can also comprise functional ceramics which absorb radiation and emit radiation of a different, in particular longer wavelength.

Preferably, a support wheel axial with the heating wheel for supporting the preforms at a supporting ring embodied at each of the preforms is provided at the heating wheel, and the holding device comprises a holding cap which can be lowered to an opening region of the preform to press the supporting ring of the preform against the support wheel, in particular a recess for passing through a heating rod being embodied in the holding cap. With this arrangement, the preform can be stabilized in a phase between the acceptance from an infeed starwheel and the lowering into the heating chamber. This permits a particularly quick transfer of the preforms from an infeed starwheel to the holding device or from the holding device to a discharge starwheel, so that the time during which the infeed starwheel or discharge starwheel has to additionally stabilize or accompany the preform can be reduced.

Preferably, the holding device comprises a gripper for holding the preform at an opening region of the preform, in particular a recess for passing through a heating rod being embodied in the gripper. This permits particularly short transfer times between the infeed or discharge starwheel and the holding device. Transfer can thus be effected before the preform and the heating chamber have been brought into a position essentially coaxial with respect to each other. The gripper can be embodied either as internal or as external gripper.

Preferably, the gripper is a roll clamp which is embodied such that the preform can be simultaneously held and rotated about is main axis. This facilitates uniform heating of the preform in the heating chamber, in particular in combination with a rotary drive acting from above at the opening region of the preform.

In a preferred embodiment, a segmented bearing plate for a supporting ring embodied at the preform is provided at the heating chamber, where the segments of the bearing plate can be moved apart for introducing the preform into the heating chamber. This facilitates the introduction of the preform into the heating chamber in particular for preforms where the diameter of the supporting ring is only slightly larger than the outer diameter of the portion of the preform to be introduced into the heating chamber.

Preferably, gripping elements are provided at the segments of the bearing plate which can be engaged with an opening region of the preform by joining the segments to fix the preform radially and/or axially with respect to the heating chamber. Thereby, the preform can be particularly stably and easily fixed with respect to the heating chamber, in particular also to prevent tilting. A separate holding mechanism acting radially or acting to prevent tilting can thus be omitted.

In one advantageous embodiment, a segmented bearing plate for a supporting ring embodied at the preform is provided at the heating chamber, where the segments of the bearing plate can, for ejecting the preform, be pushed apart in the axial direction in particular against the pretension of the spring, in particular by folding in the segments into the heating chamber, and where furthermore a bottom flap is provided at the heating chamber that can be folded out in particular against a pretension of the spring, so that the preform can be ejected by opening the bottom flap. This permits a particularly quick ejection of the preform out of the heating chamber. Here, it is in particular not necessary to previously withdraw the heating rod from the preform.

Preferably, a watertight sealing bottom flap is provided at the heating chamber, so that the heating chamber can be flooded with a cleaning liquid and the latter can be drained by opening the bottom flap. This permits easy cleaning of the heating chamber while it is operationally mounted.

Preferably, the lifting device is adapted for lifting and lowering the heating rod, the lift between the loading or withdrawal position and the radiation position, in particular a lower end position of the heating rod in the radiation position, being adjustable. Thereby, the lifting mechanism can be adapted to preforms of different sizes. In particular, excessive lift can be prevented thereby. It is equally possible to exactly adapt the lower end position of the heating rod to the size of the preform.

In a particularly advantageous embodiment, a variable lifting arc is provided for adjusting the lift and/or the end position. Thereby, an easily realized mechanism for adjusting the lift that is equally effective for all heating modules can be realized.

Preferably, the lifting device comprises a slide for lifting and lowering the heating rod, a stop mechanism being provided in particular at the lower end position of the heating rod for limiting the lift of the slide. Thereby, a mechanism for adjusting the lift, which can also be adjusted individually for each heating module, can be provided. The slide is preferably driven pneumatically, hydraulically or electrically.

Preferably, the lifting device comprises a magnetic cam for lifting and lowering the heating chamber, in particular in connection with an electromagnetic heating coil provided in the heating chamber or a permanent magnet provided at the heating chamber, to lift or lower the heating chamber by magnetic interaction with the cam. Thereby, a contactless and thus low-wear control device for the lifting device can be provided. By the contactless active principle, collision with other mechanically acting controlling systems of the heating chamber can be comparably easily prevented.

In one preferred embodiment, several heating circuits are situated vertically one upon the other.

In a particularly advantageous embodiment, the heating chambers are arranged on the heating wheel in groups in form of concentric rings, the heating chambers of the respective inner ring being arranged in the loading or withdrawal position offset with respect to the rotational position between the heating chambers of the respective outer ring. Thereby, a particularly narrow machine pitch can be realized. At the same time, it is possible to load or empty the heating chambers of the inner ring through the spaces between the heating chambers of the outer ring.

In a particularly advantageous embodiment, the holding device comprises at least two swiveling grippers to hold a preform to be heated in the heating chamber in the radiation position and simultaneously hold at least one further preform previously heated in the heating chamber in a storage position, the grippers being adjusted such that, in case of a change of position, one gripper changes from the radiation position to the storage position, and one gripper changes from the storage position to the radiation position. It is thereby possible to transport the heated preforms along on the heating wheel for at least one further rotation of the heating wheel to thus provide compensation time during which a spatial temperature distribution can compensate in the preforms.

Preferably, the lifting device of the furnace comprises a common drive unit for lifting/lowering the holding device and the heating rod as well as lift translating means, in particular a transmission, which connects the heating rod and the holding device to further lift/lower the heating rod relative to the holding device with the drive unit. Thereby, a separate drive for the heating rod or the holding device is dispensable. Such a lift mechanism with lift translation is particularly reliable.

Preferably, the lift translating means comprises at least two gearwheels for adjusting a ratio of the lifting speed of the holding device and the relative lifting speed between the holding device and the heating rod. Thereby, a coordination of the required linear motions during the change from the loading position to the radiation position can be ensured in a simple and reliable manner. As gearwheels, in particular toothed wheels and the like are suited. By adjusting the ratio of the diameters of the gearwheels, gear transmission can be realized, and the positioning travels of the holding device and the heating rod can be adapted to preforms and holding devices of different sizes.

BRIEF DESCRIPTION OF THE DRAWINGS

Preferred embodiments of the disclosure are represented in the drawing. In the drawing:

FIGS. 4a, 4b and 4c show schematic longitudinal sections through variants of a holding device according to the disclosure;

FIGS. 5a and 5b show a schematic plan view onto and a schematic longitudinal section through a variant of the holding device according to the disclosure;

DETAILED DESCRIPTION OF THE PREFERRED EMBODIMENT

Figure 1:
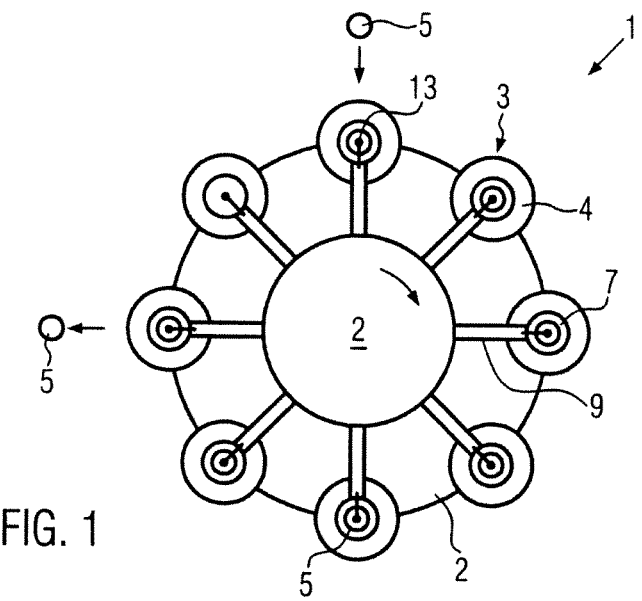
FIG. 1 shows a schematic plan view of a furnace according to the disclosure of a first embodiment.

As can be seen in FIG. 1, a first embodiment of the furnace 1 according to the disclosure comprises a heating wheel 2 with heating modules 3 uniformly distributed at the periphery thereof, each with a heating chamber 4 for heating a preform 5 and with a holding device 7 for holding the preform 5. Furthermore, a lifting device 9 is provided at the heating module 3 by means of which the vertical position or a position in the axial direction with respect to the longitudinal axis 5' of the preform 5 of the heating chamber 4 and/or the holding device 7 can be adjusted. The lifting device 9 is in particular used to change between a loading or withdrawal position 11, in which the preform 5 does not overlap with and is not arranged above the heating chamber 4 in the axial direction, and a radiation position 12 in which a section 5a of the preform 5 to be heated is arranged within the heating chamber 4. The lifting device 9 that will be described more in detail below can be designed for lifting/lowering the holding device 7 and/or the heating chamber 4.

Figure 2:
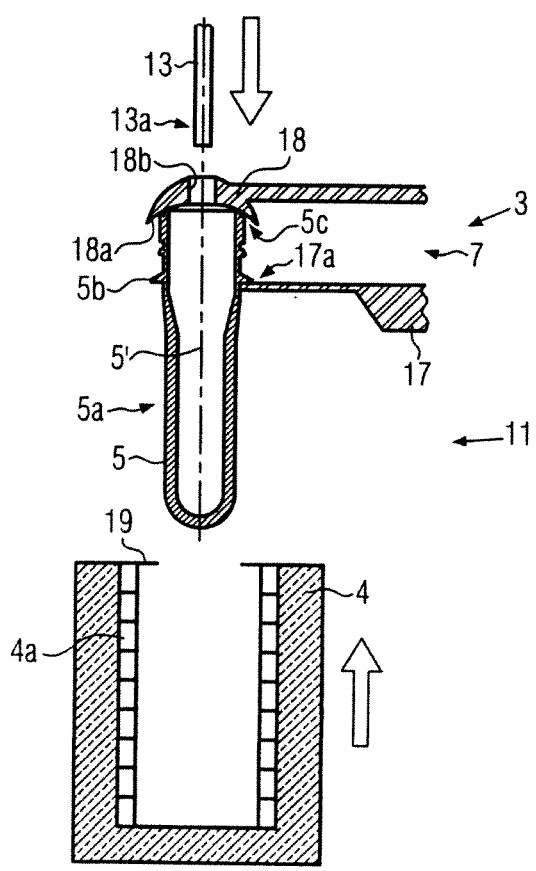
FIG. 2 shows a schematic side view of a heating module of the first embodiment in a section.
Figures 3A, 3B:
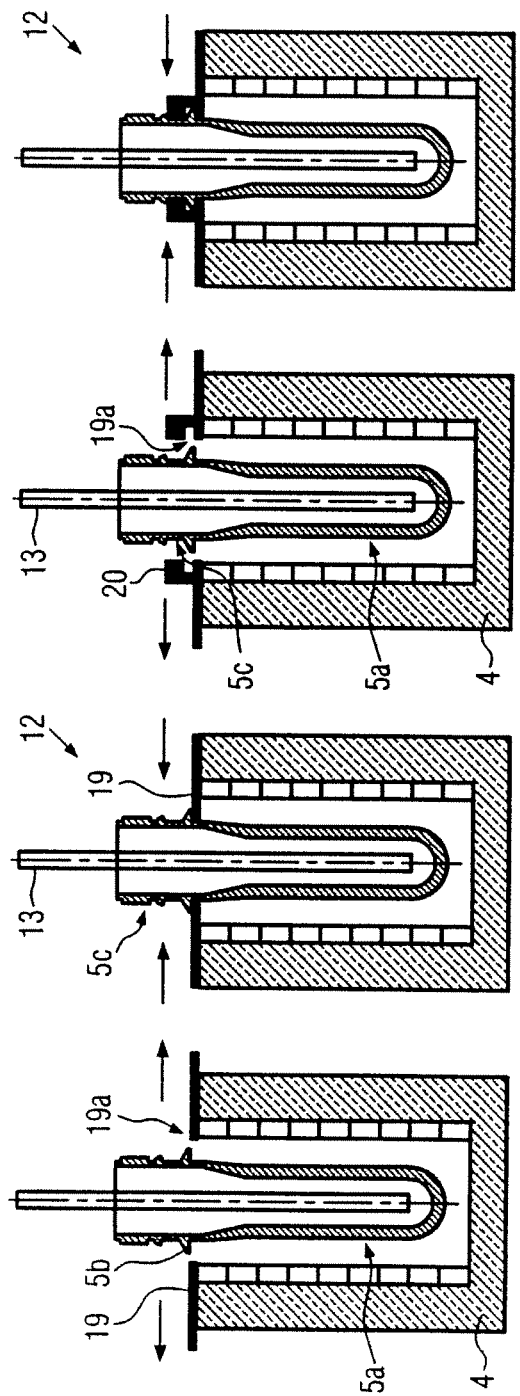
FIGS. 3a and 3b show a heating chamber according to the disclosure with different variants of a bearing plate for a preform.

The heating modules 3 moreover preferably comprise a heating rod 13 which can be introduced into the preform 5 by means of the lifting device 9 for radiating the inner wall of the preform 5. In FIG. 2, the lifting device 9 is only functionally indicated by block arrows. That means, in the example of FIG. 2, the heating rod 13 and the heating chamber 4 are each moved from the shown loading and withdrawal position 11 towards the holding device 7 or the preform 5 until the radiation position 12 shown by way of example in FIGS. 3a and 3b is reached. The lifting device 9 could, for example, also move the heating rod 13 and the holding device 7 towards the heating chamber 4 or perform other suited lifting motions that permit a change between the loading and/or withdrawal position 11 and the radiation position 12.

In the loading or withdrawal position 11, the holding device 7 and the preform 5 do not overlap with the heating rod 13 in the direction of the preform's main axis 5'. In contrast, a section 13a of the heating rod 13 is arranged within the preform 5 in the radiation position 12. Thus, the loading or withdrawal position 11 is essentially characterized in that the preform 5 can be passed over to the holding device 7 horizontally or in a direction essentially perpendicular to the main axis 5', or that it can be discharged from the same. It is thereby possible to load the furnace 1 by means of a conventional infeed starwheel 14 or to discharge it by means of a conventional discharge starwheel 15 (neither of them represented in FIG. 1). This means that the infeed starwheel 14 or the discharge starwheel 15, respectively do not have to perform in any lifting motion during transfer, but that it can be embodied, for example, as conventional reduction starwheel.

FIG. 2 shows a schematic longitudinal section through the heating module 3 with a variant of the holding device 7 with a support wheel 17 rotating along at the heating wheel 2 and holding caps 18 movable relative to the same, in particular axially. An external bearing region 17a associated to each heating module 3 is embodied at the support wheel 17, at which bearing region, a supporting ring 5b embodied at the preform 5 can be supported in the axial direction. The bearing region 17a can furthermore be embodied such that it additionally fixes the preform 5 laterally in the direction of the support wheel 17.

As indicated in FIG. 2, the holding cap 18 can be engaged with an opening section 5c of the preform 5 to push the supporting ring 5b in the axial direction against the bearing region 17a. Preferably, a centering region 18a is embodied at the holding cap 18 to hold the opening region 5c in a self-centering manner with respect to the longitudinal axis 5' of the preform 5. A recess 18b is furthermore provided at the holding cap 18 through which the heating rod 13 can be introduced into the preform 5.

The holding device 7 represented in FIG. 2 has the advantage that the preform 5 can be quickly transferred from the infeed starwheel 14 to the support wheel 17 and can be already fixed by the holding cap 18 in a position in which the preform 5 is not yet aligned with the heating chamber 4 or the heating rod 13. Thus, the transfer process between the infeed starwheel 14 and the heating wheel 2 can be performed within a comparably short time. The orientation of the preform 5 with respect to the heating chamber 4 or the heating rod 13 can then be accomplished on the heating wheel 2 independent of the motion of the infeed starwheel 14. This equally applies to the unloading of the fully heated preforms 5 to the discharge starwheel 15. Thereby, in particular the lifting device 9 can be operated independent of the infeed starwheel 14 or the discharge starwheel 15, respectively.

As is furthermore shown in FIG. 2, a bearing plate 19 is preferably provided at the heating chamber 4 on which the supporting ring 5b of the preform 5 can be supported in the radiation position 12. It is thus possible to transfer the preform 5 from the support wheel 17 to the bearing plate 19. For this, the bearing surface 17a of the support wheel 17 could be, for example, embodied to be movable and be removed from the supporting ring 5b when the preform 5 is transferred to the bearing plate 19.

In the heating chamber 4, heating elements 4a for radiating the preform 5 are provided, such as for example heating spirals which are preferably embedded in a ceramic layer. However, light-emitting diodes, lasers, halogen spot lights or any combination of different radiators are also possible. It is also possible to provide ceramic layers which transform the emission spectrum of a radiator 4a, for example bright radiation, into radiation of a longer wavelength. Such functional ceramics, but also reflecting layers, are in particular advantageous at the heating rod 13, for example to realize a passively heated heating rod 13.

FIGS. 3a and 3b show partial views of the heating module 3 in the radiation position 12, wherein one movable, segmented bearing plate 19 each is provided at the heating chambers 4 whose direction of motion is marked by horizontal arrows each. Accordingly, the segments of the bearing plate 19 can for example be pulled apart for loading the heating chamber 4 with the preform 5 to facilitate loading in particular with preforms 5 having comparably large outer diameters. It would of course also be conceivable to swivel or tilt the bearing plate 19 or individual segments of the bearing plate 19.

To fix the preform 5 in its radiation position 12 with respect to the heating chamber 4, the segments of the bearing plate 19 are pushed together and form a bearing surface 19a for the supporting ring 5b of the preform 5 in the state where they are pushed together. This is in particular advantageous if the diameter of the supporting ring 5*b* is only slightly larger than the outer diameter of the section 5*a* of the preform 5 to be heated. In FIG. 3*a*, the bearing plate 19 is designed for axially fixing and centering the preform 5 in the heating chamber 4.

At the bearing plate 19 of FIG. 3*b*, gripper elements 20 are embodied in addition and can be engaged with the opening region 5*c* of the preform 5 to also secure the preform 5 against tilting against the heating chamber 4. The gripper elements 20 can moreover further improve the centering and axial fixing of the preform 5.

To be able to adapt the heating modules 3 to preforms 5 of different outer diameters, it is advantageous to embody the bearing plate 19 as quickly exchangeable fitting. In this case, the bearing plate 19 could be connected to the heating module 3 or the heating chamber 4 by way of a quickly exchangeable coupling (not represented). As quickly exchangeable coupling, e.g. a magnetic coupling is suited.

FIGS. 4*a* to 4*c* show alternative embodiments of the holding device 7. Accordingly, the holding device 7 can comprise, for example, a hollow drilled internal gripper 21 or a hollow drilled external gripper 22 with a recess 21*a* or 22*a* for passing through the heating rod 13. The grippers 21, 22 are each embodied such that they can be engaged with the opening region 5*c* of the preform 5, such that the preform 5 is axially held at the holding device 7 in a position axially secured and secured against tilting. The grippers 21, 22 could hold the opening region 5*c* for example positively, but also nonpositively, e.g. with the aid of elastic clamping jaws (not represented). The advantages of the grippers 21, 22 are comparable to those of the arrangement of FIG. 2. In particular, the grippers 21, 22 also permit a particularly quick and reliable acceptance from the infeed starwheel 14 or transfer to the discharge starwheel 15. With the grippers 21, 22, the preform 5 can moreover be particularly easily placed onto the bearing plate 19.

As is illustrated in FIG. 4*c*, the holding device 7 may not only comprise grippers or jaws, but also be slotted and pretensioned. For example, pretensioned tongs 21' for holding the preform 5 at its opening region 5*c*, in particular at the inner side of the opening region 5*c*, are conceivable. The tongs 21' could comprise at least one outer contact surface 21*b'* tapering in the direction of a supporting ring 21*a'* for the preform 5. Thereby, the preform 5 can be held at its inner surface without pushing the same downwards by the pretension of the collet chuck 21' in an undesired manner.

FIGS. 5*a* and 5*b* show an alternative embodiment of the external gripper 22 in the form of a roll clamp 23 which permits to pivot the preform 5 in an axially and radially fixed position about its main axis 5'. Such a roll clamp 23 could comprise, for example, rollers 24 and a tension spring 25 and would be in particular suited for driving the preform 5 at its opening region 5*c* with a rotary drive 26 from above. This is schematically indicated in FIG. 5*b* where the heating rod 13 could be guided in a hollow shaft 27 that is here indicated only schematically. The roll clamp 23 is also designed for a quick and reliable transfer of the preforms 5 from the infeed starwheel 14 or to the discharge starwheel 15.

It is common to the described variants of the holding device 7 that they can be brought into a loading and/or withdrawal position 11 which permits a particularly quick and easy transfer of the preform 5 from the infeed starwheel 14 or to the discharge starwheel 15. The change of the holding device 7 to the radiation position 12 can then be accomplished independent of the infeed starwheel 14 or the discharge starwheel 15 on the still rotating heating wheel 2. Thereby, the process speed can be optimized altogether, as a transfer region to be covered together by the holding device 7 as well as by the infeed starwheel 14 or the discharge starwheel 15 can be kept comparably small or can be left again quickly after the preform 5 has been transferred.

Figure 6:
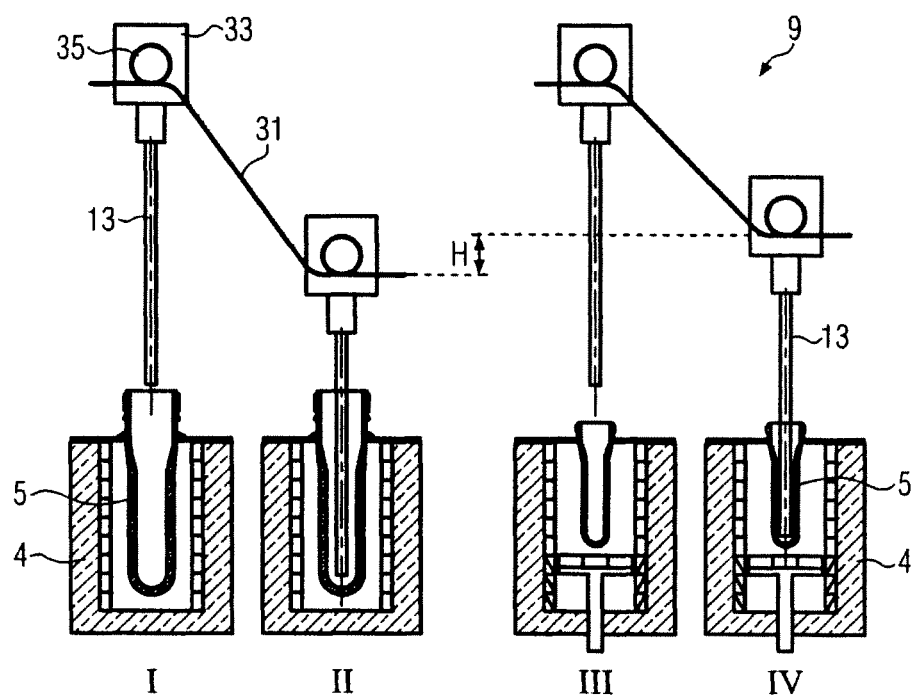
FIG. 6 shows a schematic side view of an adjustable cam and lowering the heating rod according to the disclosure.

FIG. 6 illustrates the operating mode of the lifting device 9 with reference to an adjustable cam 31. Accordingly, the vertical position of the heating rod 13 is adjusted with the cam 31, the heating rod being mounted to a slide 33 which follows the cam 31 by means of a cam roller 35.

In the left of FIG. 6 (positions I and II), a situation during the conditioning of a comparably large preform 5 is represented, and in the right (positions III and IV), for comparison a situation during the conditioning of a comparably small preform 5. The heating rod 13 must be lowered in each case into the preform 5 from an upper position I or III to a lower position II or IV corresponding to the radiation position 12. To adjust in particular the lower end position of the heating rod 13 in the positions II or IV to the size of the preform 5, the lift of the cam 31, in particular its lower end position, can be adjusted by the value H. The height-adjustable cam 31 represented in FIG. 6 offers, compared to a non-adjustable cam, the advantage that a complete replacement of the cam control or of the heating rod 13 in case of a change between preforms 5 of different sizes is dispensable. The adjustment of the heating chamber bottom additionally represented at the positions III and IV only has an illustrative character in this context.

Figure 7:
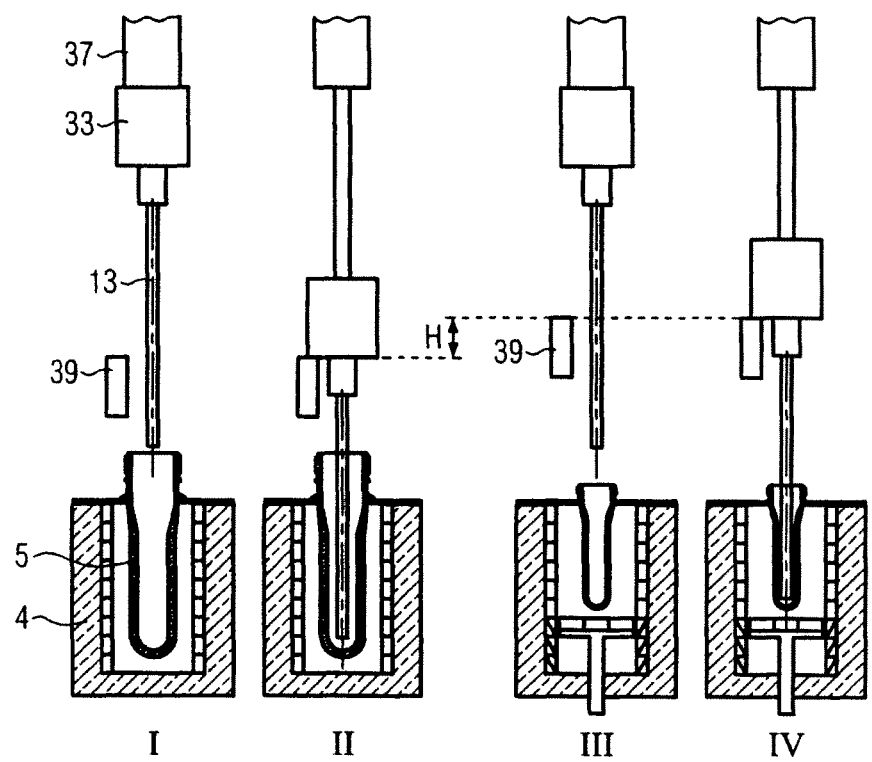
FIG. 7 shows a schematic side view of an adjustable stop mechanism for a lifting device according to the disclosure.

In FIG. 7, a variant of the lifting device 9 is represented by means of which essentially the same advantages can be achieved as with the arrangement of FIG. 6. The difference is essentially that the slide 33 for the heating rod 13 is directly moved by a pneumatically or hydraulically operated cylinder 37. To adjust the submersion depth of the heating rod 13 into the preform 5, here, too, analogously to the adjustable cam 31 of FIG. 6, an end stop 39 for lift limitation is adjusted to fix in each case a lower end position of the slide 33. The positions I to VI of FIG. 7 essentially correspond to those of FIG. 6, so that in FIG. 7, too, a height adjustment by the value H can be performed to adapt the lifting device 9 to the size of the preform 5. As an alternative to the cylinder 37, a linear motor or an electric motor with a spindle could also be used (not represented). In this case, the mechanical end stop 39 would be dispensable as the lower end position of the heating rod 13 could then be directly fixed by the motor control.

Figure 8:
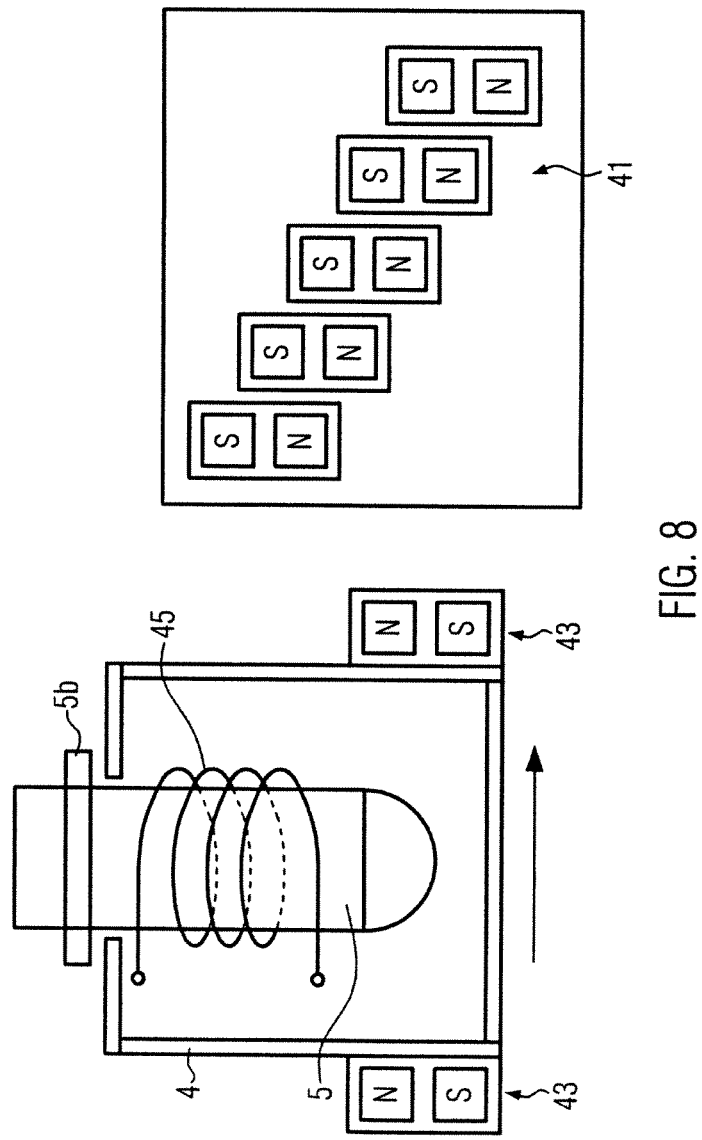
FIG. 8 shows a schematic representation of a magnetically acting cam for a heating chamber according to the disclosure.

FIG. 8 shows a variant of the lifting device 9 for lifting and lowering the heating chamber 4 with the aid of a magnetic cam 41 (N=north pole; S=south pole). The latter cooperates for example with permanent magnets 43 provided at the heating chamber 4 while the heating chamber 4 passes along the cam 41 (indicated by arrows). As an alternative, it would also be conceivable to generate the magnetic interaction with the stationary magnetic cam 41 temporarily electromagnetically by the current flow in a heating spiral 45 of the heating chamber 4 as is schematically indicated in FIG. 8 in a simplified manner. In this case, the permanent magnets 43 at the heating chamber 4 would be dispensable. Such a magnetic height adjustment of the heating chamber 4 offers the advantage that it can be effected without contact, to on the one hand reduce mechanical wear and on the other hand create space for further control devices.

It will be understood that the above described variants of the lifting device 9 can be arbitrarily combined with each other. It is in particular possible to also use the variants represented with respect to the heating rod 13 for lifting and lowering the holding device 7 and/or the heating chamber 4. It would also be possible to lift and/or lower the holding device 7 and/or the heating rod 13 with a magnetic cam 41.

Figure 9:
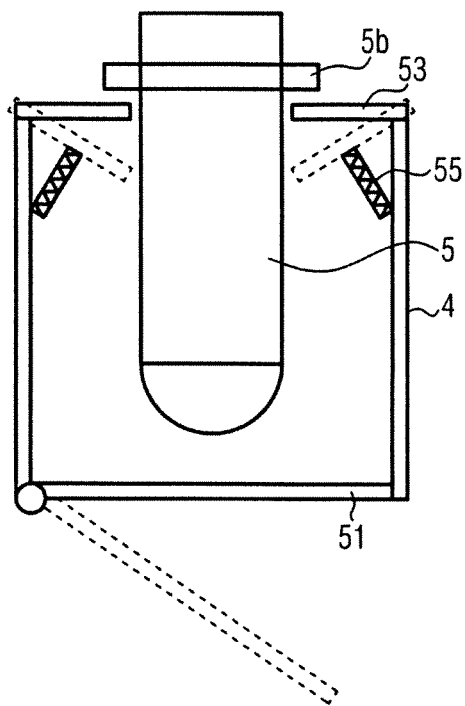
FIG. 9 shows a schematic side view of an alternative embodiment of the heating chamber with a folding mechanism for ejecting the preform.

FIG. 9 shows a variant of the heating chamber 4 which permits to eject the preform 5 out of the heating chamber 4 in essentially the same direction in which it is introduced into the heating chamber 4. To this end, a bottom flap 51 folding to the outside is provided at the heating chamber 4, as well as at least one bearing plate 53 folding to the inside. The bearing plate 53 can be designed such that it can be pushed inwards by the supporting ring 5b of the preform 5 against the pretension of a spring 55 (to the position drawn in a dotted line), so that the supporting ring 5b can be pushed past the bearing plate 53 into the heating chamber 4. It is also advantageous if the bottom flap 51 can be pushed downwards against the pretension of a spring (not represented) (see position drawn in a dotted line). However, other closing mechanisms for the bottom flap 51 or the bearing plate 53, respectively, are also conceivable. The bottom plate 51 can in particular have a watertight design, so that the heating chamber 4 can be flooded with a liquid for cleaning purposes (not represented) and after cleaning can be emptied again by opening the bottom flap 51. Such cleaning is particularly advantageous as it can be accomplished without dismantling the heating chamber 4.

However, the bearing plate 53 could also be foldable or movable upwards to eject the preform 5 out of the heating chamber 4 after heating.

Figure 10:
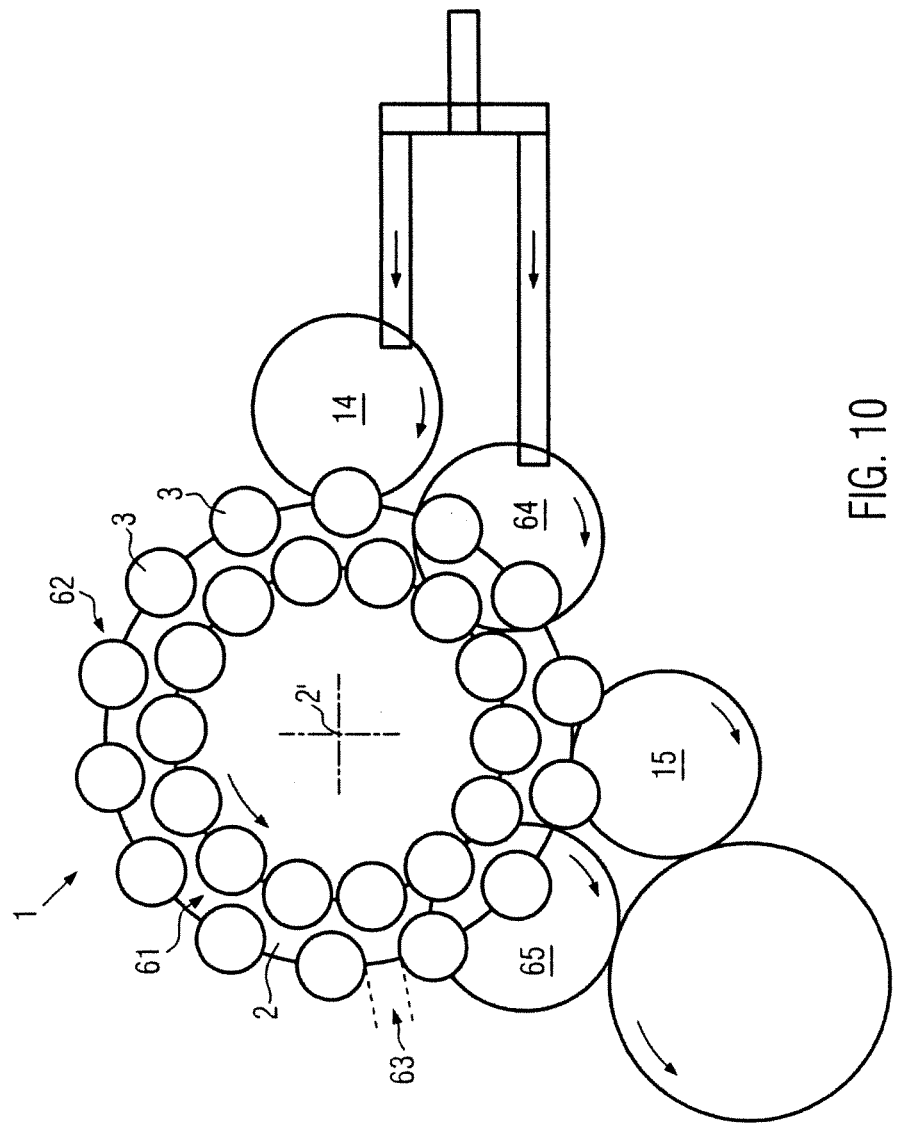
FIG. 10 shows a second embodiment of the furnace according to the disclosure with two heating module groups arranged concentrically and offset with respect to the rotational position.

FIG. 10 shows a second embodiment of the furnace 1 according to the disclosure in which the heating modules 3 are arranged at the heating wheel 2 in a particularly space-saving manner. Accordingly, the heating modules 3 are arranged concentrically in two annular groups 61, 62 around the axis of rotation 2' of the heating wheel 2. For optimum use of space, the heating modules 3 of the inner group 61 are preferably arranged at a distance as small as possible with respect to each other. To facilitate the access to the heating modules 3 of the inner group 61 during loading and unloading the heating chambers 4, the heating modules 3 of the inner group 61 are preferably arranged with respect to the rotational position or machine pitch each between the heating modules 3 of the outer group 62. That means, with respect to the rotational position or machine pitch, the heating modules 3 of the inner and outer groups 61, 62 preferably alternate. It is thereby ensured that the heating modules 3 of the inner group 61 are each radially or laterally accessible by way of the space 63 between the heating modules 3 of the outer group 62.

Preferably, for the inner and outer group 61, 62, separate infeed starwheels 14, 64 and separate discharge starwheels 15, 65 are each provided. With the concentric arrangement of the heating modules 3 in at least two annular groups 61, 62, the space available on the heating wheel 2 can be utilized particularly efficiently.

Here, it would also be possible to rotate the heating modules 3 of the inner or outer group 61, 62 by separate drives at angular velocities independent of each other. In this case, the heating modules 3 of the outer group 62 could also be arranged at a minimum distance with respect to each other, and/or more than two concentric groups 61, 62 could be efficiently operated on one heating wheel 2.

Figure 11:
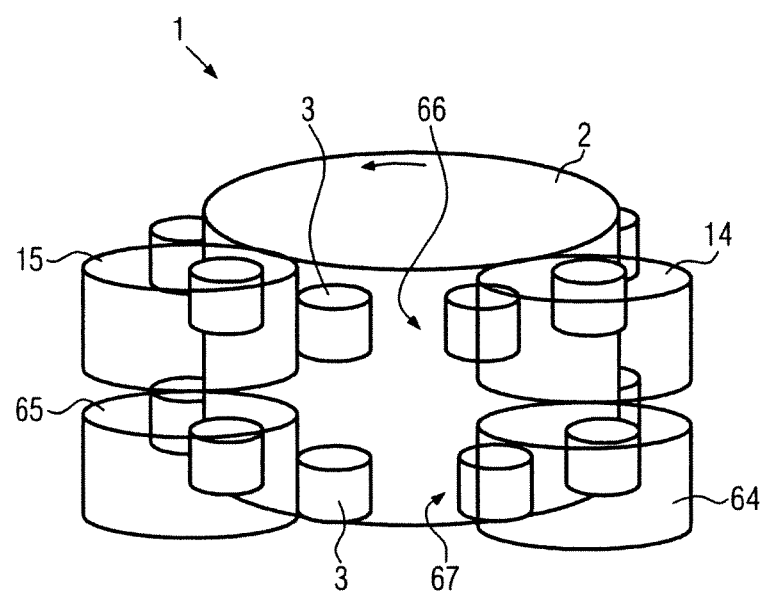
FIG. 11 shows a wire-frame model view of a variant of the second embodiment in which two heating module groups are arranged one upon the other.

FIG. 11 in a schematic view shows an alternative arrangement of two heating module groups 66, 67 which are vertically arranged one upon the other, i.e. at identical positions with respect to the rotational position or machine pitch. In this manner, one can heat twice the number of preforms 5 with the same diameter of the heating wheel 2 in a surface saving manner.

It would also be possible to design the heating chambers 4 such that one heating chamber 4 receives two preforms 5 at two levels. Preferably, the preforms 5 are then transported and heated in opposite orientation, in the upper circle 66 the opening 5c points upwards, in the lower circle 67, the opening 5c points downwards.

Figure 12:
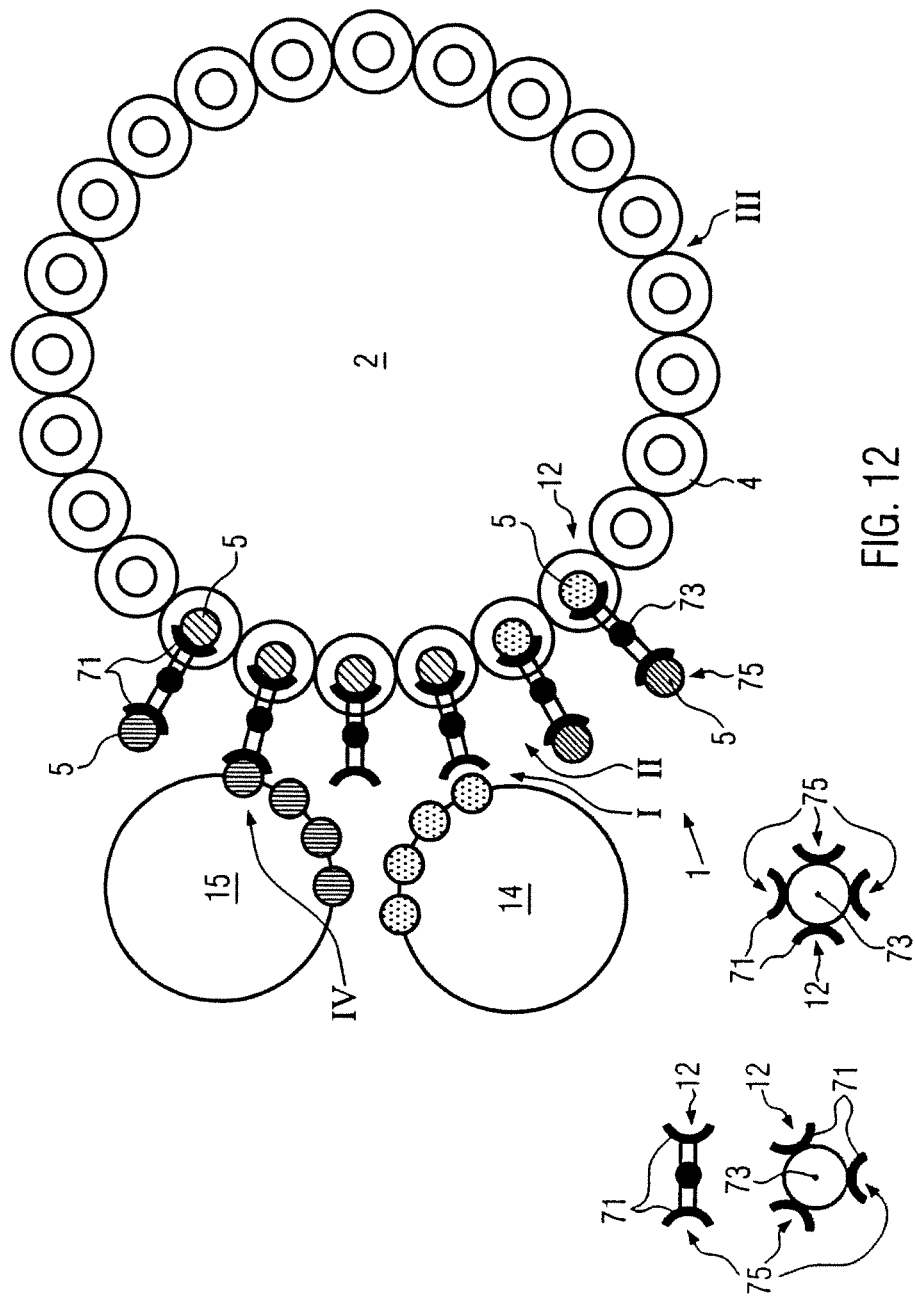
FIG. 12 shows a third embodiment of the furnace according to the disclosure, in which the holding device comprises two swiveling grippers each, as well as alternative variants of the swiveling gripper arrangement.

FIG. 12 shows a third embodiment of the furnace 1 according to the disclosure in which already heated preforms 5 can be carried along on the heating wheel 2 outside the heating chambers 4 in a storage position 75 for at least one further rotation of the heating wheel 2 to permit temperature compensation in the preforms 5 before the transfer of the preforms 5 to the discharge star 15.

To this end, the holding devices 7, as indicated in FIG. 12, are provided with at least two clamps 71 for holding the preforms 5. Here, a number of positions of the clamps 71 which corresponds to the number of clamps 71 and which the clamps 71 each successively assume, is provided at the holding devices 7, the positions of the clamps 71 being changed once per rotation of the heating wheel 2. If two clamps 71 are provided per holding device 7, as represented in FIG. 11, the clamps 71 change their relative position after each rotation of the heating wheel 2. In the example, this would correspond to a rotation of the clamps 71 by 180° about the common axis of revolution 73.

As an alternative, however, a greater number of clamps 71 could be also provided at each holding device 7, for example three or four. In these cases, three or four positions of the clamps 71 would be correspondingly provided at the holding device 7, where the clamps 71 would then be further rotated by an amount of 120° or 90°, respectively, per rotation of the heating wheel 2, to take the respective successive position at the holding device 7. The number of storage positions 75 per mounting 7 is then in each case the total number of positions per mounting 7 minus 1, as indicated in the left bottom of FIG. 12.

In the example, it is assumed that the clamps 71 of a holding device 7 are each rigidly interconnected via the common center of motion 73. However, this is not imperative. It would also be possible to move the clamps 71 of a holding device 7 individually and/or with the aid of other swiveling and/or lifting devices. Here, it is decisive that the preforms 5 are forwarded to the next position of the holding device 7 with each rotation of the heating wheel 2, before the preforms 5 are finally transferred to the discharge starwheel 15.

In other words, besides the radiation position 12, at least one storage position 75 of the preforms 5 is provided in which they are transported along on the heating wheel 2 to permit temperature compensation before the preforms 5 are transferred to the discharge starwheel 15. This storage position 75 could also at least temporarily correspond to the loading and/or withdrawal position 11. It is decisive that in the storage position 75, at least one additional rotation of the heating wheel 2 is provided for the temperature compensation of the preforms 5.

The compensation time in the storage position 75 is essentially used to smooth a temperature profile in the wall of the preforms 5 generated during heating of the preforms 5 in the heating chamber 4. With a holding device 7 with two clamps 71, a compensation time corresponding to one rotation of the heating wheel 2 can be for example generated in a simple manner. Correspondingly, a compensation time corresponding to two rotations of the heating wheel 2 could be achieved with three clamps 71 per holding device 7, and analogously, a compensation time corresponding to three rotations of the heating wheel 2 with four clamps 71 per holding device 7.

The working mode of the third embodiment can be explained as follows with reference to the positions I to IV represented by way of example in FIG. 12:

At position I, cold preforms 5 are transferred from the infeed starwheel 14 to a clamp 71 of the holding device 7.

At position II, the holding device 7 is rotated by 180°, so that the previously accepted preform 5 is oriented with respect to the heating chamber 4 and can be lowered into the latter. At position II, by the rotation of the holding device 7, a previously heated preform 5 is simultaneously also rotated by 180° to the outside to the storage position 75 where it travels along for one rotation of the heating wheel 2 for temperature compensation.

At position III, where the clamps 71 and the corresponding preforms 5 are no longer represented for the sake of simplicity, the respectively inner preform 5 in the radiation position 12 is heated in the heating chamber 4, while the respective outer preform 5 travels along on the heating wheel 2 in the storage position 75 for temperature compensation until the discharge starwheel 15 is reached.

At position IV, the outer preform 5 reaches the discharge starwheel 15 at the end of the compensation time and is transferred, starting from the storage position 75, to the discharge starwheel 15. The inner preform 5 can be further heated at this point in time, but is removed from the heating chamber 4 at the latest at position II to change from the inner position to the outer storage position 75 by rotation about 180°.

This is analogously also conceivable with several clamps 71 per holding unit 7, where at position II the position of the clamps 71 always changes to the respective next position.

With the transfer of the preforms 5 in the above-described embodiments and variants, one can monitor with sensors (not described more in detail), for example to avoid double loading of a heating module 3 if a preform cannot be correctly ejected. Moreover, a control for identifying incorrect or missing loading of a heating module can be provided to avoid waste of energy and/or overheating of the heating chamber 4 by not heating it. For example, in an emergency stop situation during production, the preform 5 could be automatically ejected.

Figure 13:
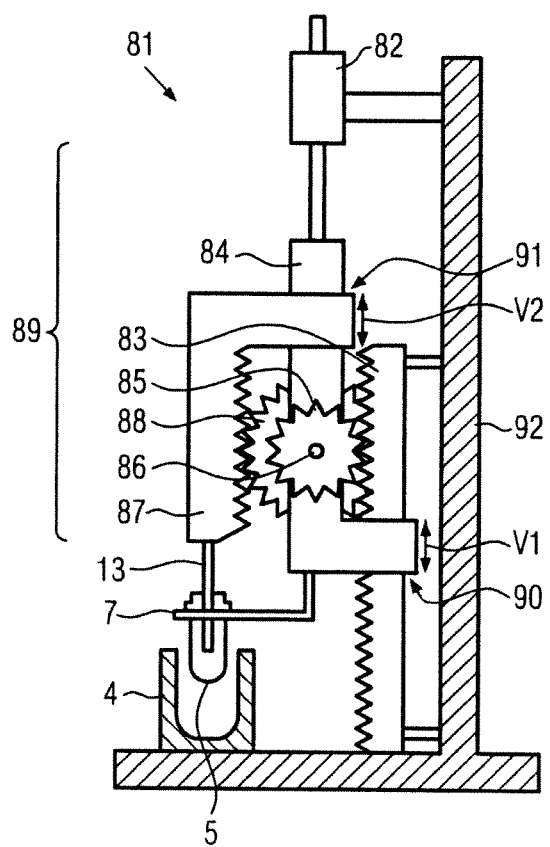
FIG. 13 shows a fourth embodiment of the furnace according to the disclosure, in which a common drive unit is provided for lifting and lowering the holding device and the heating rod.

FIG. 13 shows a further embodiment 81 of the lifting device 9 for lifting/lowering the heating rod 13 and the holding device 7 by means of a common drive unit 82. This could be a linear motor, a servomotor, a pneumatic or, hydraulic drive, or any other suited linear actuator. The lifting device 9 in this case comprises a vertically stationary first toothed rack 83 and a slide 84 vertically movable at the same and mechanically coupled, for example by way of a rod, to the drive unit 82. A first gearwheel 85 is rotatably mounted on a shaft 86 at the slide. The first gearwheel 85 engages the first stationary toothed rack 83.

Preferably, a heating chamber 4 associated to the lifting device 81 is rigidly connected with the first toothed rack 83. That means the heating chamber 4 is not lifted or lowered during a change from the loading position 11 to the radiation position 12. However, it would be possible to nevertheless design the heating chamber 4 to be vertically adjustable to adapt the vertical position of the heating chamber 4 to the length of the preform 5 to be radiated. For the radiation of a short preform 5, the heating chamber would then be arranged at a shorter distance to the holding device 7 and the heating rod 13 than for the radiation of a long preform 5. The lifting motions of the holding device 7 and the heating rod 13 must in this case also be adapted to the respective position of the heating chamber 4. As normally all heating chambers 4 of the heating wheel 2 are loaded with identical preforms 5, and thus all heating chambers 4 preferably take an identical vertical position, in a preferred variant, the heating chambers 4 can be mounted on the heating wheel 2 by means of a common, vertically adjustable support (not represented). Thereby, the vertical position of the heating chambers 4 with respect to the holding device 7 and the heating rod 13 can be particularly easily adapted to the length of the preform 5. This adaptation serves minimization of the positioning travels between the loading position 11 and the radiation position 12, in particular to shorten the required process time per preform 5.

The holding device 7, and thus also a preform 5 to be radiated, is rigidly connected to the slide 84, preferably in the vertical direction. For the preform 5, however, a rotary bearing can be provided in the holding device 7 (not shown). A second toothed rack 87 is vertically movably mounted to the slide 84 and meshes with a second gearwheel 88 which is also rotatably mounted to the slide 84 and connected to the first gearwheel 85 via the shaft 86. Thus, the first and the second toothed rack 83, 87 are coupled to each other by means of the first and second gearwheel 85, 88 such that the drive 82 moves the slide 84 with the holding device 7 relative to the first toothed rack 83 and the heating chamber 4, and the second toothed rack 87 with the heating rod 13 additionally by a linear motion translated by way of the gearwheels 85, 88 relative to the slide 84.

The described toothed racks 83, 87, the gearwheels 85, 88, the slide 84 and the shaft 86 thus have the function of lift translating means in the form of a mechanical gear 89 to couple the motion of the heating rod 13 to the motion of the holding device 7 in a synchronized way, in particular in a fixed ratio of the associated lifting speeds V1 and V2. As can be taken from FIG. 13, the speed of the heating rod 13 with respect to the heating chamber 4 results from the addition of the absolute speed V1 of the slide 84 and the relative speed V2 of the second toothed rack 87 with respect to the slide 84. As only one common drive unit 82 per heating chamber 4 is provided, for the relocation and thus for the positioning travels of the slide 84 and the second toothed rack 87, corresponding interrelationships result.

Here, the ratio of speed or relocation of the slide 84 and the holding device 7 to the additional speed or relocation of the second toothed rack 87 with the heating rod 13 can be adjusted by the ratio of the diameters of the gearwheels 85, 88, or, with according sizes of the teeth, by the respective number of teeth. It will be understood that the toothing of the gearwheels 85, 88 and the toothed racks 83, 87 could be as fine as desired, depending on the frictional behavior of the engaging components. That means it would also be conceivable that the gearwheels 85, 88 and the toothed racks 83, 87 in an extreme case are replaced by functionally comparable elements which only or preponderantly establish a frictional connection to each other, as is the case, for example, with frictional wheels. Then, the toothed racks 83, 88 could be replaced by suited sliding rails. As an alternative, an additional transmission (not shown) or the like could also be provided at the slide 84, in particular between the gearwheels 85, 88.

Here, it is decisive that at the lifting device 81, a drive coupling and a lift translation are provided between the holding device 7 and the heating rod 13. This has the effect that the holding device 7 with the preform 5 and the heating rod 13 can be driven together and cover different distances, thus move at different absolute speeds towards the heating chamber 4 or away from it. With a gear ratio of 1:1, that means with an identical diameter of the gearwheels 85, 88, the heating rod 13 covers in each case twice the distance with respect to the heating chamber 4 compared to the preform 5 held in the holding device 7. Thus, the motion of the heating rod 13 and the holding device 7 can be coupled in a fixed ratio by the gear transmission unit 89.

Here, the ratio of the two linear motions can be adapted to the dimensions of the preform 5 to be heated, so that a reproducible and coordinated change of the holding device 7 and the heating rod 13 between the loading and/or withdrawal position 11 and the radiation position 12 is ensured. Thereby, an exact positioning of the holding device 7 and the heating rod 13 relative to the furnace, but also relative to each other, is ensured at any time. For example, collisions of the components moved in the process are even largely excluded in case of emergency stops.

For mounting the slide 84 and the toothed rack 87, suited bearings 90, 91 are provided whose functioning is generally known, so that a description thereof can be omitted here. For the sake of good order, a holding frame 92 is indicated in FIG. 13 which can be, for example, part of a heating wheel.

With the embodiment 81, a particularly compact and narrow structural shape of the lifting device 9 can be realized. It will be understood that the representation in FIG. 13 is only schematic in this respect. Individual heating stations can be consequently mounted on the heating wheel at a particularly narrow pitch. The weight and costs for a second drive unit of the heating stations can be saved, including the additional drive energy and the associated control and monitoring units. Furthermore, a synchronized motion of the held preform 5 and the heating rod 13 is in a simple manner enforced, and damages or production rejects due to collisions or lacking synchronization are avoided.

Thus, one can ensure in a simple and reliable manner that the preform 5 can be lowered into the heating chamber 4 at least over a distance at least corresponding to its length, while the heating rod 13 must be lowered over a longer distance, for example to be additionally lowered by one of the variants of the holding device 7 according to the disclosure. It will be understood that the lifting device 9 with drive coupling and lift translation by the transmission 89 could also be combined in a technically advantageous manner with other ones of the described embodiments.

The invention claimed is:

1. Rotary-type furnace for conditioning preforms for stretch blowing plastic containers, comprising a heating wheel at which several heating modules for heating one preform each are arranged, the heating modules each comprising: a heating chamber for radiating the preform with infrared radiation; a holding device for holding the preform; and a lifting device for lifting and lowering the holding device and/or the heating chamber to change between a loading or withdrawal position, in which the preform is located outside the heating chamber, and a radiation position in which a section of the preform is arranged within the heating chamber, wherein the holding device comprises a gripper for holding the preform at an opening region of the preform, and wherein the lifting devices of individual heating modules are independently controlled.

2. Furnace according to claim 1, wherein the heating modules comprise a heating rod for radiating the preform with infrared radiation, and the lifting device is further adapted for lifting and lowering the holding device and/or the heating rod to change between the loading or withdrawal position, in which moreover the holding device and the preform do not overlap with the heating rod in the direction of a main axis of the perform, and the radiation position in which moreover a section of the heating rod is arranged within the preform.

3. Furnace according to claim 2, wherein the lifting device is adapted for lifting and lowering the heating rod, the lifting device being adjustable between the loading or withdrawal position and the radiation position.

4. Furnace according to claim 3, and a variable lifting control cam for adjusting the lifting device and/or a lower end position.

5. Furnace according to claim 3, wherein the lifting device comprises a slide for lifting and lowering the heating rod, a stop mechanism for limiting the slide.

6. Furnace according to claim 5, wherein the stop mechanism is at a lower end position of the heating rod.

7. Furnace according to claim 3, wherein the radiation position comprises a lower end position of the heating rod in the radiation position.

8. Furnace according to claim 3, wherein the lifting device comprises a common drive unit for lifting/lowering the holding device and the heating rod, as well as lift translating means, that connects the heating rod and the holding device to lift/lower the heating rod relative to the holding device with the common drive unit.

9. Furnace according to claim 8 wherein the lift translating means comprises a transmission.

10. Furnace according to claim 2, wherein the lifting device comprises a common drive unit for lifting/lowering the holding device and the heating rod, as well as a lift translating means that connects the heating rod and the holding device to lift/lower the heating rod relative to the holding device with the common drive unit.

11. Furnace according to claim 10, wherein the lift translating means comprises at least two gearwheels for adjusting a ratio of a lifting speed (V1) of the holding device to a relative lifting speed (V2) between the holding device and the heating rod.

12. Furnace according to claim 10, wherein the lift translating means comprises a transmission.

13. Furnace according to claim 1, and a support wheel coaxial with the heating wheel is provided at the heating wheel for supporting the preform at a supporting ring of each preform, and the holding device comprises a holding cap that can be lowered to an opening region of the preform to press the supporting ring of the preform against the support wheel.

14. Furnace according to claim 13, and a recess for passing through a heating rod in the holding cap.

15. Furnace according to claim 1, wherein the gripper is a roll clamp such that the preform can be simultaneously held and rotated about a main axis.

16. Furnace according to claim 1, and a segmented bearing plate for a supporting ring of the perform is provided at the heating chamber, whereby the segments of the bearing plate can be pushed apart for ejecting the preform in an axial direction, and a folding bottom flap that can be folded out is provided at the heating chamber, so that the preform can be ejected by opening the bottom flap.

17. Furnace according to claim 16, wherein the segments of the bearing plate are pushed apart against the pretension of a spring.

18. Furnace according to claim 16, wherein the segments of the bearing plate are folded into the heating chamber, when the segments are pushed apart.

19. Furnace according to claim 16, wherein the folding bottom flap is folded out against the pretension of a spring.

20. Furnace according to claim 1, wherein the lifting device comprises a magnetic cam for lifting and lowering the heating chamber.

21. Furnace according to claim 20, and an electromagnetic heating coil provided in the heating chamber, or a permanent magnet provided at the heating chamber, to lift or lower the heating chamber by magnetic interaction with the magnetic cam.

22. Furnace according to claim 1, wherein heating chambers are grouped on the heating wheel in the form of concentric rings, the heating chambers of a respective inner ring being arranged in the loading or withdrawal position offset with respect to a rotational position between the heating chambers of a respective outer ring.

23. Furnace according to claim 1, wherein the holding device comprises at least two grippers to hold a preform to be heated in the heating chamber in the radiation position and simultaneously hold at least one further preform previously heated in the heating chamber in a storage position, the grippers being adjusted such that during a change of position one gripper swivels from the radiation position to the storage position, and one gripper swivels from the storage position to the radiation position.

24. Furnace according to claim 1, and wherein the gripper comprises a recess for passing through a heating rod and/or the gripper being a collet chuck.

25. Rotary-type furnace for conditioning preforms for stretch blowing plastic containers, comprising a heating wheel at which several heating modules for heating one preform each are arranged, the heating modules each comprising: a heating chamber for radiating the preform with infrared radiation; a holding device for holding the preform; a lifting device for lifting and lowering the holding device and/or the heating chamber to change between a loading or withdrawal position, in which the preform is located outside the heating chamber, and a radiation position in which a section of the preform is arranged within the heating chamber; and a segmented bearing plate for an annular supporting ring of the preform is provided at the heating chamber, wherein segments of the bearing plate can be moved apart for introducing the preform into the heating chamber.

26. Furnace according to claim 25, wherein, at the segments of the bearing plate, gripping elements are provided which can be engaged with an opening region of the preform by joining the segments of the bearing plate to fix the preform radially and/or axially with respect to the heating chamber.

27. Rotary-type furnace for conditioning preforms for stretch blowing plastic containers, comprising a heating wheel at which several heating modules for heating one preform each are arranged, the heating modules each comprising: a heating chamber for radiating the preform with infrared radiation; a holding device for holding the preform; a lifting device for lifting and lowering the holding device and/or the heating chamber to change between a loading or withdrawal position, in which the preform is located outside the heating chamber, and a radiation position in which a section of the preform is arranged within the heating chamber; and a watertight sealing bottom flap is provided at the heating chamber, so that the heating chamber can be flooded with a cleaning fluid and the cleaning fluid can be drained by opening the bottom flap, wherein the bottom flap is capable of at least one of: permitting to eject the preform out of the heating chamber, and being pushed downwards against a pretension of a spring.

\* \* \* \* \*